(12) United States Patent
Pedrick et al.

(10) Patent No.: US 11,733,085 B2
(45) Date of Patent: Aug. 22, 2023

(54) WEIGH-IN-MOTION SENSOR CONSTRUCTIONS

(71) Applicants: Measurement Specialties, Inc., Hampton, VA (US); Measurement Specialties (China) Ltd., Shenzhen (CN)

(72) Inventors: Michael Pedrick, Hampton, VA (US); Shenghua Liu, Shenzhen (CN); Benxiang Wang, Shenzhen (CN); Ling Qiu, Shenzhen (CN); Zhong Luo, Shenzhen (CN); Weixing Fu, Shenzhen (CN)

(73) Assignees: TE CONNECTIVITY SOLUTIONS GMBH, Schaffhausen (CH); MEASUREMENT SPECIALTIES (CHINA) LTD., Shenzhen (CN)

( * ) Notice: Subject to any disclaimer, the term of this patent is extended or adjusted under 35 U.S.C. 154(b) by 164 days.

(21) Appl. No.: 17/173,180

(22) Filed: Feb. 10, 2021

(65) Prior Publication Data
US 2021/0255028 A1   Aug. 19, 2021

(51) Int. Cl.
*G01G 19/03* (2006.01)
*G01G 3/13* (2006.01)
*G01L 1/16* (2006.01)

(52) U.S. Cl.
CPC ........... *G01G 19/035* (2013.01); *G01G 3/13* (2013.01); *G01L 1/16* (2013.01)

(58) Field of Classification Search
CPC .... G01G 19/03; G01G 19/035; G01G 19/024; G01G 3/13; G01G 21/167; G01G 23/01; G01L 1/16
See application file for complete search history.

(56) References Cited

U.S. PATENT DOCUMENTS

| | | | | |
|---|---|---|---|---|
| 4,286,680 | A * | 9/1981 | Maltby | G01G 5/003 |
| | | | | 177/208 |
| 5,461,924 | A | 10/1995 | Calderara et al. | |
| 10,782,178 | B2 * | 9/2020 | Pedrick | G01G 19/03 |

FOREIGN PATENT DOCUMENTS

EP   3546897 A1   10/2019

OTHER PUBLICATIONS

Extended European Search Report, European Application No. 21156750.8-1001, European Date, dated Jun. 29, 2021.

* cited by examiner

*Primary Examiner* — Randy W Gibson (57) ABSTRACT

Weigh-in-motion sensors comprise a beam including a plate with a load-bearing surface, and a tube portion including a base wall and a cover and defining a cavity therebetween. A sensing package is disposed within the cavity and is under pre-load with the cover and the base wall. The sensing package comprises a piezoelectric element. The base wall includes an aperture extending from a mounting surface to the cavity. The aperture includes a fastener therein to secure the sensing package within the cavity. The fastener is sized having a cross-section dimension taken through a center axis of the fastener that is greater than that of a cross-section dimension of the piezoelectric element taken along the fastener center axis. In an example, the fastener has a cross-section dimension sized about 10 percent or greater in dimension than that of the respective cross-section dimension of the piezoelectric element.

18 Claims, 4 Drawing Sheets

WEIGH-IN-MOTION SENSOR CONSTRUCTIONS

CROSS-REFERENCE TO RELATED APPLICATION

This patent application claims priority to Chines Patent Application No. 202010092892.8 filed Feb. 14, 2020, which application is hereby incorporated by reference in its entirety.

FIELD

Weigh-in-motion sensor constructions as disclosed herein relate to load transfer mechanisms and sensing packages or assemblies used therewith configured to measure forces exerted on the load transfer mechanisms and, more particularly, to pre-load configurations used with such sensors that have been specially designed to provide a desired combination of sensor sensitivity and stress resistance.

BACKGROUND

Weigh-in-motion sensors are typically installed in a roadway and extend at least partially across a width of the roadway to measure the dynamic ground forces of vehicles (e.g., automobiles and trucks) traveling along the roadway as the vehicles move over the sensors. The measurement data from the weigh-in-motion sensors is typically used to calculate axle weights of the vehicles, and such information can be used to determine if any vehicles are non-compliant with set regulations (e.g., overweight), for future infrastructure planning, and the like.

Weigh-in-motion sensors typically include an elongated housing that has top and bottom plates and a cylindrical tube disposed between the top and bottom plates. The weigh-in-motion sensors also have narrow transitions or necks that join the cylindrical tube to the top and bottom plates. A sensing element is held within the cylindrical tube in pre-load between upper and lower interior surfaces of the tube. Known weigh-in-motion sensors are vertically symmetric, such that the sensing element is located at a vertical midpoint of the housing between the top and bottom plates.

There is a trade-off in weigh-in-motion sensors between sensitivity (e.g., accuracy and precision of measuring the forces) and structural integrity of the sensor housing. For example, sensitivity may be increased by directing more of the external load to the sensing element, but known sensors housings that direct sufficient load to the sensing element for increased sensitivity suffer from high combined stresses, which may reduce the operational lifetimes of the sensor housings. Known sensor housings experience high stresses at the narrow transition or neck region between the top plate and the cylindrical tube. The structural integrity of the housing may be improved (and the operational lifetime increased) by increasing the stiffness in the housing, which directs a greater percentage of the external load through structural support paths in the housing instead of through the sensing element. But, reducing the load that is directed to the sensing element may undesirably reduce the measurement sensitivity.

It is, therefore desired, that weigh-in-motion sensors be developed in a manner that provides a desired degree of sensor measurement sensitivity while also having a sufficient degree of structural integrity to resist stress and thereby expand end-use applications and provide enhanced operational longevity in such end-use applications.

SUMMARY

Weigh-in-motion sensor constructions as disclosed herein comprise a beam that is elongated along a depth axis of the sensor construction. The beam comprises a plate with a load-bearing surface, and a tube portion including a base wall and a cover and defining a cavity between the base wall and the cover. A sensing package is disposed within the cavity of the beam and under pre-load in engagement with the cover and the base wall. The sensing package comprises a piezoelectric element. The base wall includes an aperture extending therethrough from a mounting surface to the cavity. The aperture is configured to receive a fastener therethrough to secure the sensing package within the cavity. The fastener is sized having a cross-section dimension taken through a center axis of the fastener that is greater than that of a cross-section dimension of the piezoelectric element taken along the fastener center axis. In an example, the fastener may have a cross-section dimension sized about 10 percent or greater in dimension than that of the respective cross-section dimension of the piezoelectric element. In an example, the fastener may be sized from about 20 to 100 percent greater in dimension than that of the respective dimension of the piezoelectric element. In an example, the base wall laterally extends from a first edge to a second edge that is opposite the first edge, and wherein the cover is joined to the base wall at or proximate to the first and second edges. In an example, the beam further comprises a neck extending between and joining the plate to the cover of the tube portion.

In an example, the sensing package further comprises an upper electrode disposed on an upper surface of the piezoelectric element, a lower electrode disposed on a lower surface of the piezoelectric element; and a guide plate interposed between the upper and lower electrodes. The guide plate comprises a first planar section having an opening therethrough and accommodating placement of the piezoelectric element therein. The first planer section extends radially to a second section that extends axially away from the first section. In an example, the sensing package further comprises an upper dielectric layer interposed between the first electrode and the cavity, and a lower dielectric layer interposed between the second electrode and a substrate, wherein the substrate is interposed between the lower dielectric layer and the fastener. In an example, the guide plate second section extends axially a distance along a portion of a sidewall surface of the substrate towards the fastener. In an example, the substrate is formed from a metallic material and has a cross-section dimension that is greater than the piezoelectric element, and that is greater than the cross-section dimension of the fastener.

BRIEF DESCRIPTION OF THE DRAWINGS

Weigh-in-motion sensor constructions and pre-load configurations as disclosed herein will now be described by way of example with reference to the accompanying figures, of which.

DETAILED DESCRIPTION

Weigh-in-motion sensor constructions as disclosed herein comprise pre-load configurations that have been specially engineered to provide combined properties of desired sensor measurement sensitivity and improved resistance to external stress when compared to conventional weigh-in-motion sensors. Such weigh-in-motion sensors generally comprise a load transfer mechanism that includes a sensing package and a beam that structurally protects and supports the sensing package. The sensing package is configured to measure forces exerted on the beam. As used herein, the term "sensing package" refers to one or more electrical elements that generate an electrical output signal responsive to a mechanical force application on the sensing package. The sensing package may include at least one piezo electric element. As noted, weigh-in-motion sensors comprising pre-load configuration as disclosed herein expand the possible range of end-use applications not previously possible with conventional sensors while also extending the effective sensor service life within such range of uses.

Weigh-in-motion sensors comprising pre-load configurations as disclosed herein provide the load transfer mechanism the ability to absorb increased levels of external forces with reduced internal stress within the beam relative to known sensor housings or load transfer mechanisms. Further, in conjunction with the reduced internal stress in the beam, the pre-load configuration enables the beam to direct a greater percentage of the external load through the sensing assembly with a high degree of measurement sensitivity.

Although one or more embodiments of weigh-in-sensors comprising example pre-load configurations are described herein, it is recognized that the pre-load configurations disclosed herein may not be limited to weigh-in-motion applications. For example, such pre-load configurations may be used in conjunction with other applications to measure external forces exerted on the beam, such as industrial applications, lab testing applications, and the like.

Figure 1:
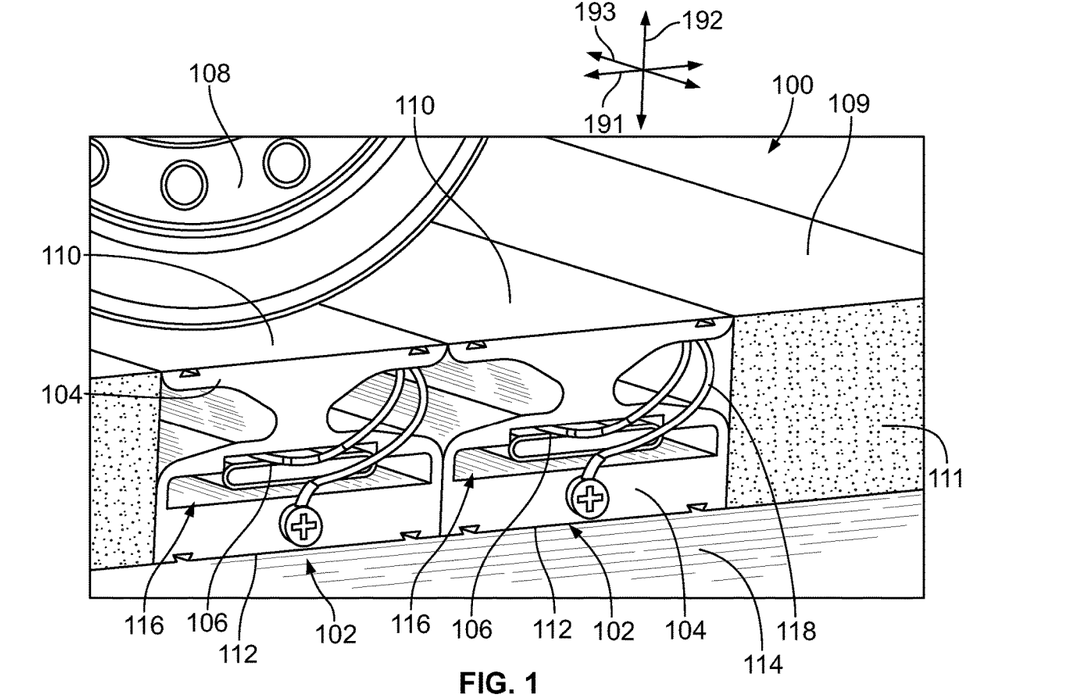
FIG. 1 is a perspective view of an example weigh-in-motion sensor comprising an example pre-load configuration as disclosed herein as disposed herein as installed in an end-use application.

FIG. 1 is a perspective view of a measurement system 100 that includes multiple sensor assemblies 102 in accordance with an embodiment. Each of the sensor assemblies 102 includes a respective beam 104 and at least one sensing package 106. The sensing packages 106 are held within the respective beams 104. The two sensor assemblies 102 in the illustrated embodiment are disposed side-by-side, but may be spaced apart from each other in an alternative embodiment. The measurement system 100 is oriented with respect to a lateral axis 191, a vertical axis 192, and a longitudinal or depth axis 193. The axes 191-193 are mutually perpendicular. Although the vertical axis 192 appears to extend in a vertical direction parallel to gravity in FIG. 1, it is understood that the axes 191-193 are not required to have any particular orientation with respect to gravity.

The beams 104 of the sensor assemblies 102 are elongated along the depth axis 193. Each of the beams 104 extends vertically from a load-bearing surface 110 to a mounting surface 112. The mounting surfaces 112 are disposed on a foundation structure 114. The beams 104 define cavities 116 that are vertically spaced apart from the load-bearing surfaces 110 and the mounting surfaces 112. The sensing packages 106 are disposed within the cavities 116. In the illustrated embodiment, the measurement system 100 is a weigh-in-motion sensor system.

FIG. 1 shows a portion of a wheel 108 of a vehicle traveling on the load-bearing surfaces 110 of the sensor assemblies 102. The load-bearing surfaces 110 of the adjacent sensor assemblies 102 are generally flush with a road surface 109. For example, the sensor assemblies 102 may be embedded within a road material 111, such as concrete, gravel, asphalt, or the like, that defines the road surface 109. The vehicle may be an automobile, a truck, a motorcycle, a recreational vehicle, or another type of vehicle. The vehicle moves generally laterally such that the wheel 108 moves over the adjacent sensor assemblies 102, and exerts a mechanical force on the load-bearing surface 110 of each of the beams 104. The mechanical force exerted by the wheel 108 on the load-bearing surface 110 is transmitted through the internal structure of the beam 104, and at least a portion of the force is exerted on the sensing package 106 within the cavity 116. In an embodiment, the force exerted on the sensing package 106 causes the sensing package 106 to generate an electrical output signal proportional to the amount of force. The electrical output signal is conveyed along one or more electrical wires 118 to a remote processor (not shown), which is configured to convert the electrical output signal to a measurement parameter, such as a weight of the vehicle at the axle including the wheel 108.

Although the two sensor assemblies 102 are side-by-side in the illustrated embodiment, the measurement system 100 may have various different numbers and arrangements of sensor assemblies 102 in alternative embodiments. For example, two or more sensor assemblies 102 may be arranged end-to-end along the depth axis 193 across at least one lane of the road. In another example, two or more sensor assemblies 102 may be spaced apart laterally from each other such that the road material 111 is disposed between and separates the two sensor assemblies 102.

Although in the illustrated embodiment the wheel 108 directly engages the load-bearing surfaces 110, in an alternative embodiment the load-bearing surfaces 110 may be separated from the wheel 108 via one or more intervening layers. The one or more intervening layers may include a layer of pavement, concrete, gravel, adhesive binders, composite materials or the like. The beams 104 optionally may be at least partially embedded within a filler material, such as concrete, dirt, gravel, adhesive binders, or the like, to secure the positioning of the beams 104.

Figure 2:
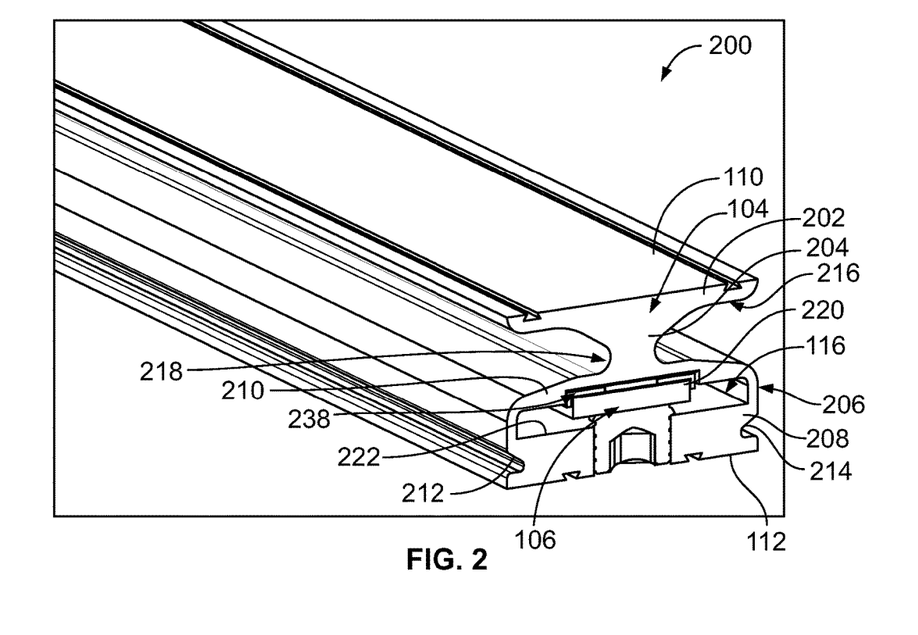
FIG. 2 is a perspective view of an example weigh-in-motion sensor comprising an example pre-load configuration as disclosed herein as also shown in cross-section.

FIG. 2 is a perspective side view of an example weigh-in-motion sensor 200 as disclosed herein comprising the beam 104, and that includes a cross-sectioned section for purposes of better illustrating the configuration and features of the sensing package 106. The beam 104 includes a plate 202, a neck 204, and a tube portion 206. The plate 202 defines the load-bearing surface 110. The tube portion 206 defines the cavity 116 that holds the sensing package 106. The neck 204 extends between the plate 202 and the tube portion 206 and joins the plate 202 to the tube portion 206.

The tube portion 206 includes a base wall 208 and a cover 210. The cavity 116 is defined between the base wall 208 and the cover 210. The base wall 208 defines the mounting surface 112. The cover 210 is located between the neck 204 and the base wall 208 and is joined to the neck 204. The base wall 208 laterally extends (e.g., along the lateral axis 191) between a first edge 212 of the base wall 208 and a second edge 214 of the base wall 208 (which is opposite the first edge 212). The cover 210 is joined to the base wall 208 at or proximate to the first and second edges 212, 214. In the illustrated embodiment, the cover 210 is joined to the base wall 208 at the first and second edges 212, 214. But, in an alternative embodiment, the cover 210 may be joined proximate to, but not at, the edges 212, 214, such as within designated threshold distance from each of the edges 212, 214. For example, the designated threshold distance may be 5% or 10% of the lateral width of the base wall 208. From the edges 212, 214 of the base wall 208, the cover 210 extends vertically upward (e.g., towards the plate 202) and laterally.

In the illustrated embodiment, the cavity 116 has an oblong cross-sectional shape and may extend along a length of the beam 104. The neck 204 tapers from a wide end 216 at the plate 202 to a narrow end 218 at the cover 210. The wide end 216 has a greater lateral width or thickness than the narrow end 218. The neck 204 is configured to transmit forces exerted on the load-bearing surface 110 of the plate 202 to the sensing package 106 via the cover 210 of the tube portion 206. For example, the neck 204 defines a determinate load path, which is a single path that transmits the load from the plate 202 to the cover 210. The neck 204 may also limit or reduce stress concentrations internally within the beam 104 (e.g., relative to the housings of known sensor assemblies). Optionally, the plate 202 may have a greater lateral width than the wide end 216 of the neck 204.

In an embodiment, the beam 104 has a unitary, one-piece, monolithic structure. The neck 204 is integrally connected to the plate 202 and the tube portion 206, and the cover 210 of the tube portion 206 is integrally connected to the base wall 208. For example, the beam 104 may extend continuously, without seams, from the plate 202 to the base wall 208. The beam 104 in an embodiment may be formed via an extrusion process. The beam 104 may be composed of a metal material, such as aluminum, steel, and/or another metal.

Figure 3:
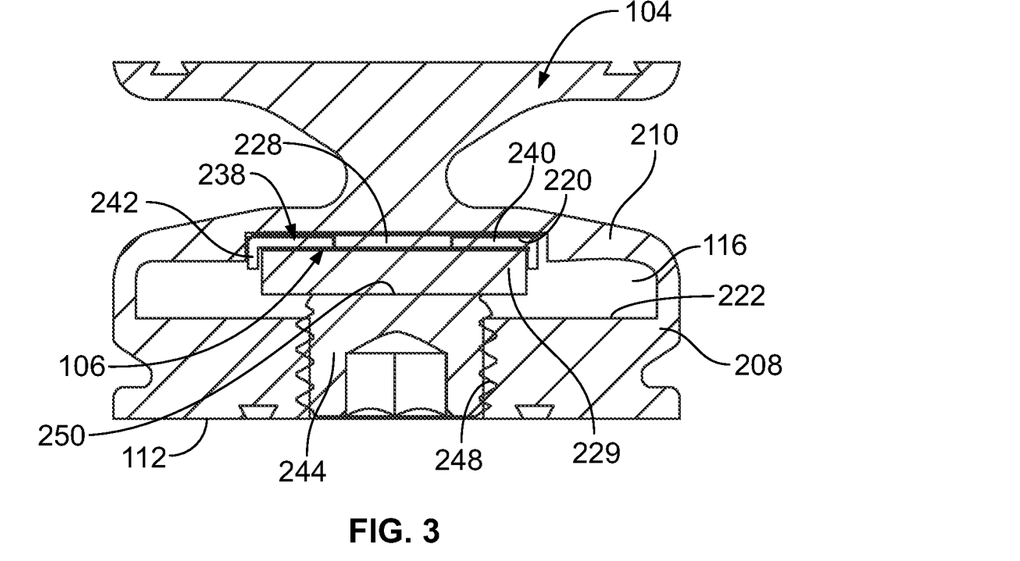
FIG. 3 is a cross-sectional view of the example weigh-in-motion sensor comprising the pre-load configuration of FIG. 2.

Referring to FIGS. 2 and 3, the sensing package 106 within the cavity 116 is disposed under pre-load between the cover 210 and the base wall 208. For example, the sensing package 106 engages an interior surface 220 of the cover 210. The cavity 116 is defined between the interior surface of the cover and an interior surface of the base wall, 222. The sensing package 106 is under pre-load exerted by the fastener 244, which is ultimately reacted by the base wall 208 and the top surface 210 of the beam 104.

Figure 4:
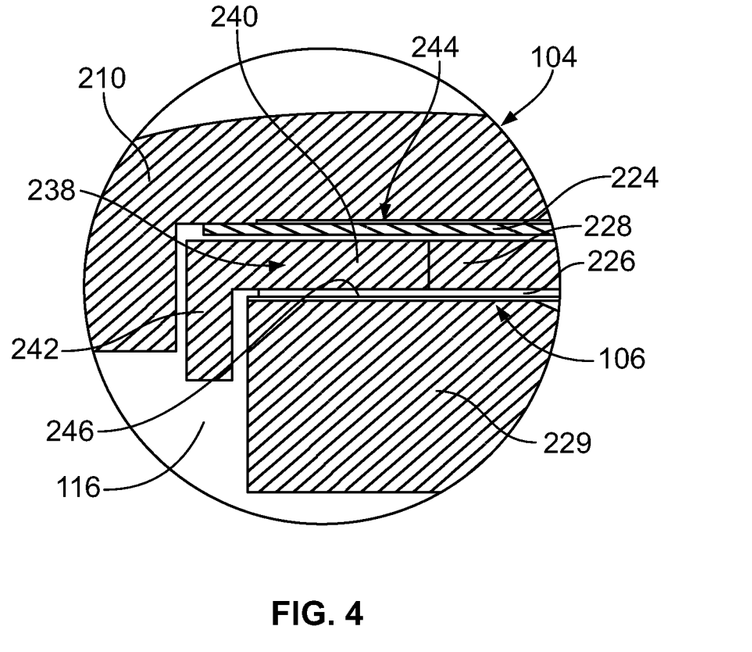
FIG. 4 is a perspective view of a portion of example sensor assembly elements shown in an unassembled state for the example weigh-in-motion sensor comprising the pre-load configuration of FIG. 3.

FIG. 4 is a magnified view of the sensing package 106 taken from the sensor construction of FIG. 3, provided for purposes of illustrating elements of the sensing package. The sensing package 106 may include multiple layers. In the illustrated embodiment, the sensing package 106 includes a first electrode 224, a second electrode 226, and a piezoelectric element 228 stacked between the two electrodes 224, 226. The first electrode 224 is disposed between the cover 210 and the piezoelectric element 228. The second electrode 226 is disposed between the piezoelectric element 228 and a base plate or substrate 229. The piezoelectric element 228 may be a crystal of quartz, tourmaline, lead zirconate titanate (PZT), or the like. Although the piezoelectric element 228 is described as singular, the piezoelectric element 228 may represent a plurality of piezoelectric elements within the sensing package 106.

In the illustrated embodiment, the sensing package 106 also includes a guide plate 238 between the first and second electrodes 224, 226. The guide plate 238 at least partially circumferentially surrounds the piezoelectric element 228 to control the position and alignment of the one or more piezoelectric elements. As illustrated in FIGS. 3 and 4, the guide plate 238 includes a first planar section 240 that at least partially circumferentially surrounds the piezoelectric element 228 and that extends radially outward to an opposed end section 242. The guide plate end section 242 extends in a downward direction for placement over opposed wall surfaces of the substrate 229 and operates to both center placement of the guide plate 238 on the substrate and form an electrically insulating barrier with wall surfaces of the cavity 116. In an example, the guide plate is formed from an electrically nonconductive material such as a polymeric or plastic material. In an example, the guide plate is formed from polyvinyl chloride.

The first and second electrodes 224, 226 may include respective metal plates or sheets. The sensing package 106 includes the substrate 229 that is vertically disposed between the second electrode 226 and a fastener 244 (as shown in FIG. 3) connected with the base wall 208. The substrate 229 may include a dielectric material, such as one or more plastics, and/or a conductive material, such as one or more metals. In an example, the substrate 229 is made from a metal such as aluminum. The sensing package 106 may have different components in alternative embodiments.

With reference FIG. 4, in an example, the electrically conductive material (e.g., metal sheets) of the electrodes 224, 226 of the sensing package 106 is mechanically separate from and electrically isolated from the beam 104. For example, an electrically insulating layer 242 is disposed between the cover 210 and the metal sheet of the first electrode 224. The insulating layer 242 may include a dielectric material, such as one or more plastics or the like. The insulating layer 242 may be a discrete component from the first electrode 224, or alternatively may represent a portion of the first electrode 224. The second electrode 226 is separated from the beam 104 by a discrete electrically insulating layer 246 disposed between the conductive metal sheet of the second electrode 226 and the substrate 229, such that the electrically insulating layer 246 provides electrical isolation of the second electrode 226 from the beam 104. Since the sensing package 106 is electrically isolated from the beam 104, the beam 104 may not be used as a ground return path through direct ohmic contact between the electrodes 224, 226 and the beam 104, which may beneficially reduce electrical interference and noise within the load transfer mechanism.

With reference to FIG. 3, the base wall 208 defines an aperture 248 that extends through the base wall 208 from the mounting surface 112 to the interior surface 222, such that the aperture 248 is open to the cavity 116. The aperture 248 receives the fastener 244 therethrough to secure the sensing package 106 in the cavity 116. In the illustrated embodiment, the fastener 244 is a threaded set screw, and the aperture 248 has respective threads that are complementary to the set screw 244. In an alternative embodiment, the fastener may be a bolt, a type of screw other than a set screw, a pin or other element that is not threadedly engaged with the aperture or the like. The fastener 244 is installed from below the mounting surface 112 of the beam 104. The fastener 244 has a terminal end 250 that abuts against an underside surface of the substrate 229 of the sensing package 106. The fastener 244 engages the substrate 229 to secure the positioning of the sensing package 106 relative to the beam 104. In an alternative embodiment in which the sensing package 106 lacks the substrate 229, the fastener 244 may engage a bottom side of the second electrode 226 with the electrically insulating layer 246 interposed therebetween.

In an embodiment, the depth that the fastener 244 extends into the base wall 208 and/or the cavity 116 may be adjusted in order to set an amount of pre-load on the sensing package 106. In the illustrated embodiment, the depth of the set screw 244 is adjusted by imparting a torque on the set screw 244. For example, increasing the depth that the fastener 244 extends into the cavity 116 may increase the amount of pre-load exerted on the sensing package 106, and reducing the depth that the fastener 244 extends into the cavity 116 may decrease the amount of pre-load exerted on the sensing package 106. By adjusting the positions of the fasteners 244 that engage multiple sensing packages 106 along a depth of a single load transfer mechanism or multiple sensor assemblies, an operator can individually tune each of the sensing packages 106 to a designated pre-load, thereby reducing or eliminating pre-load discrepancies caused by component irregularities and imperfections. Individually tuning the pre-load on each of the sensing packages 106, via the fasteners 244 extending through the base wall 208, may improve the uniformity of output as a function of applied load across the entire depth of the load transfer mechanism.

With reference to FIG. 3, it has been discovered that the size of the fastener 244 relative to the size of the piezoelectric element 228 produces an unexpected influence on both the measurement sensitivity of the sensor and the internal stress within the beam 104 when subject to force loads. Specifically, it has been discovered that sizing the diameter of the fastener 244 greater than a dimension of the piezoelectric element 228 operates to reduce the internal stress within the beam while in some instances increasing sensor measurement sensitivity, and in other instances not significantly affecting or reducing sensor measurement sensitivity.

In an example, it may be desired that the fastener 244 be sized having a diameter that is greater than about 10 percent greater, in the range of from about 20 to 100 percent greater, and in the range of from about 50 to 75 percent greater than a dimension of the piezoelectric element 228. The relevant dimension of the piezoelectric element that is used for this measurement is the largest dimension of the piezoelectric element that is disposed in vertical alignment over the fastener and as taken across a cross-section running through an axial center of the fastener as illustrated in FIG. 3.

Thus, in an instance where the piezoelectric element has a circular shape, the relevant dimension is the diameter. In an instance where the piezoelectric element has an oval or elliptical shape, the relevant dimension is the distance between diametrically opposed sections along the cross section. In an instance where the piezoelectric element has a rectangular shape, the relevant dimension is the distance between the two opposed ends along the cross section. It is to be understood that the exact increased difference in size between the fastener and the piezoelectric element can and will vary based on such factors as the type of material used to form the piezoelectric element, as well as the thickness of the piezoelectric element, the materials and configurations of the other elements used to form the sensing package, as well as the configuration of the sensor beam. In an example, the piezoelectric element may be configured to be installed within the cavity through the aperture 248 created for accommodating placement of the fastener 244 therein. Thus, in such example at least one dimension of the piezoelectric would be less than the diameter of the aperture.

Figure 5:
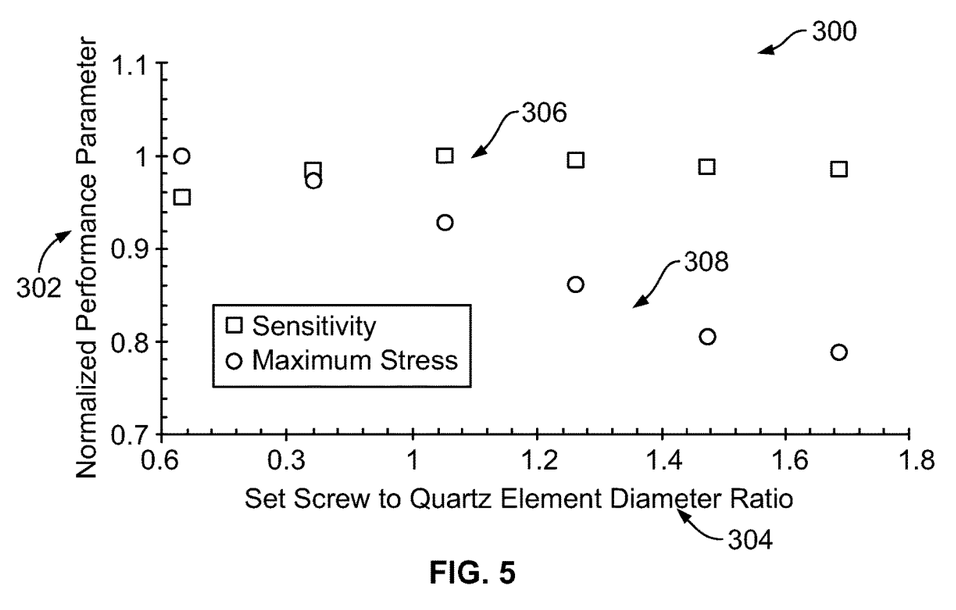
FIG. 5 is graph illustrating a relationship between sensitivity and stress for example weigh-in-motion sensors comprising example pre-load configurations as disclosed herein.

FIG. 5 is a graph 300 that illustrates normalized sensor performance parameters 302 along the Y-axis as a function of the ratio between the fastener to the piezoelectric element dimension 304 along the X-axis, e.g., diameter. The squares represent measurements taken of sensor measurement sensitivity and operate to define a sensitivity trend 306, and the circles represent measurements taken extrusion beam maximum stress and operate to define a stress trend 308. As illustrated, as the diameter of the fastener approaches the dimension, e.g., diameter, of the piezoelectric element where the diameter ratio equals approximately one, the sensor measurement sensitivity reaches a maximum, or the sensitivity trend 306 peaks. As the size ratio of the fastener to the piezoelectric element ratio increases, e.g., the diameter of the fastener increases in diameter relative to dimension or diameter of the piezoelectric element, the sensor measurement sensitivity remains fairly constant (the sensitivity trend 306 stays level) while the maximum stress in the extrusion beam decreases significantly (the stress trend 308). This represents an operating condition of nearly identical sensing performance or sensitivity at increased reliability or lower stress.

In an example, the data illustrated in FIG. 5 was generated for a weigh-in-motion sensor comprising a set screw fastener and a quartz piezoelectric element. However, it is to be understood that the same trends in sensitivity and stress performance exist in sensor examples wherein the fastener is provided in a form other than a set screw, e.g., in the form of pins or inserts that may be circular or rectangular in cross section. Similarly, while the piezoelectric element used was quartz having a circular cross section, the same trend in performance parameters exist in the event that the piezoelectric element is formed from a material other than quartz and/or is configured having a non-circular cross section or shape.

Figure 6:
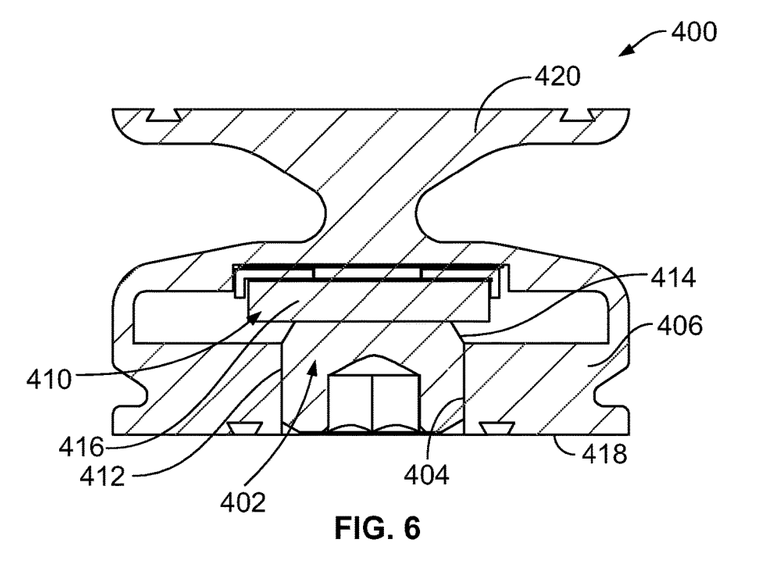
FIG. 6 is a cross-sectional view of an example weigh-in-motion sensor comprising another example pre-load configuration as disclosed herein.

FIG. 6 shows an alternative example weigh-in-motion sensor 400 as disclosed herein comprising the same general elements and configuration of as described above for the embodiment illustrated in FIGS. 2 and 3. In this example, the fastener 402 is provided in the form of a pin element rather than a threaded set screw, wherein the pin element 402 is disposed in the aperture 404 through the base 406 and may be configured having a set axial length or dimension of sufficient size to impose a desired pre-load on the sensing package 410. Alternatively, the pin element 402 may be configured to be axially movable within the aperture 404, with or without the use of other elements, to provide a desired pre-load. The pin element 402 may be of constant diameter or may have a tapered configuration. In an example, the pin element 402 has a constant diameter section 412 extending through the aperture 404 and includes a tapered section 414 extending from the aperture to the substrate 416. The pin element may be axially fixed in place relative to the aperture by a retention element, e.g., in the form of a clip or the like, accessible from the mounting surface 418 of the beam 420. Additionally, the pin element may be bonded into place through the use of an adhesive or the like while a static force is being applied to a backside of the pin to impart some pre-load onto the sensing package 410.

The pin element as used in this example has a diameter that is sized as discussed above relative to the piezoelectric element for the purpose of achieving the desired combination of sensor sensitivity and reduced beam stress. While the pin element in this example has been described as one alternative to a threaded fastener, it is to be understood that all alternative configurations of fasteners that function to impose a pre-load on the sensing package and that may be placed in vertically-aligned contact with the piezoelectric element in the cavity are within the scope of weigh-in-motion sensors and pre-load configurations as disclosed herein.

Figure 7:
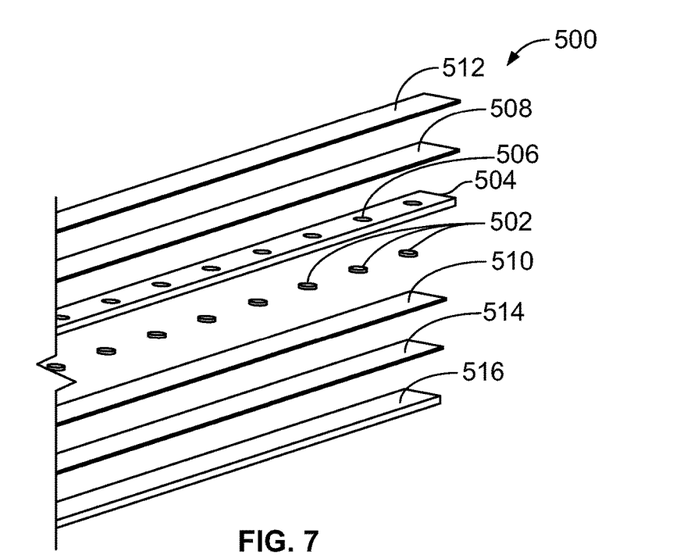
FIG. 7 is a perspective view of sensing package elements shown in an unassembled state of an example weigh-in-motion sensor comprising example pre-load configurations as disclosed herein.

FIG. 7 shows an unassembled view of the elements making up the sensing package 500 as disclosed herein. Specifically, a number of piezoelectric elements 502 are shown with the guide plate 504 positioned above the piezoelectric elements and having openings 506 sized to accommodate placement of the respective piezoelectric elements therein. First and second electrodes 508 and 510 in the form of elongated metal sheets are illustrated respectively above and below both the piezoelectric elements 502 and the guide plate 504. Electrically insulating layers 512 and 514 are positioned respectively above the first electrode 508 and below the second electrode 510. The electrically insulating layer 514 is interposed between the second electrode 510 and the substrate 516.

Figure 8:
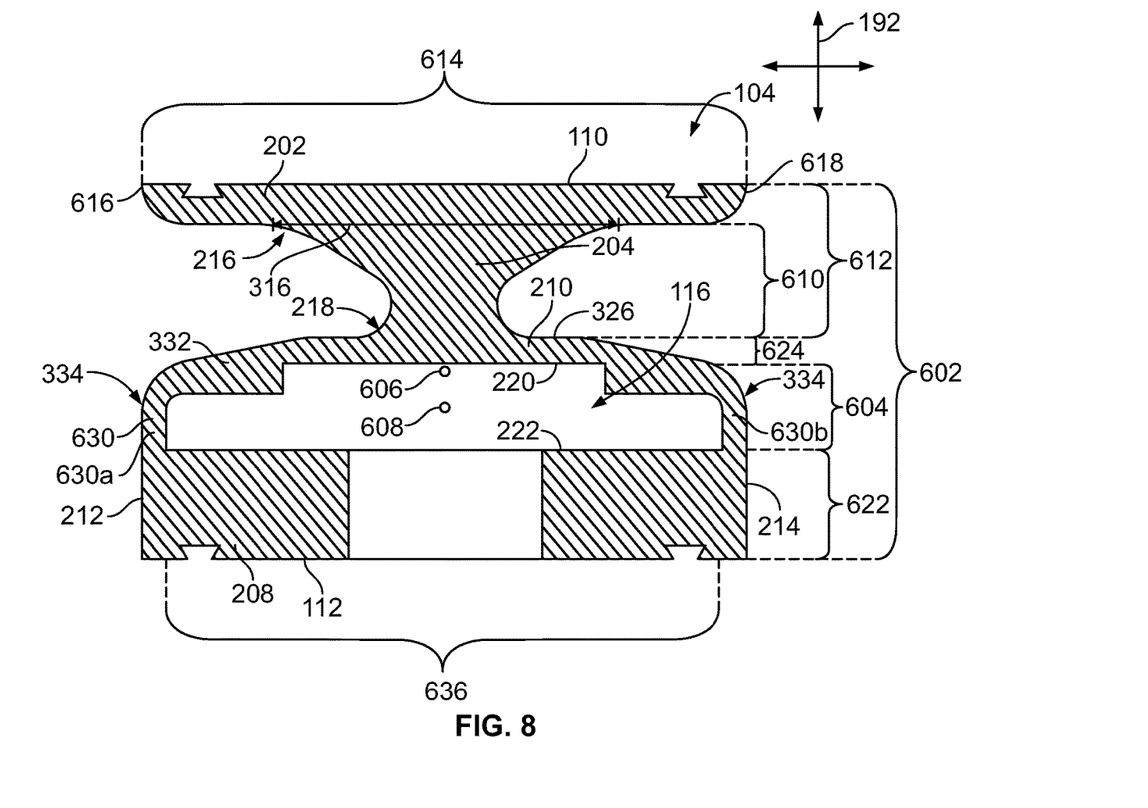
FIG. 8 is a cross-sectional view of the example weigh-in-motion sensor as disclosed herein and illustrated in FIGS. 3 and 6 without the sensing package.

FIG. 8 is a cross-sectional view of the beam 104 the load transfer mechanism 102 shown in FIGS. 2, 3 and 6. The sensing package and fastener are omitted for clarity in FIG. 8. The beam 104 extends a height 602 from the load-bearing surface 110 of the plate 202 to the mounting surface 112 of the base wall 208. The cavity 116 extends a height 604 from the interior surface 220 of the cover 210 to the interior surface 222 of the base wall 208. In the illustrated embodiment, a midpoint 606 of the height 602 of the beam 104 (e.g., halfway between the load-bearing surface 110 and the mounting surface 112) is spaced apart vertically from a midpoint 608 of the height 604 of the cavity 116. Specifically, the midpoint 606 of the beam 104 is disposed above the midpoint 608 of the cavity 116, such that the midpoint 606 is located vertically between the midpoint 608 and the load-bearing surface 110 of the plate 202. Since the cavity 116 is not vertically centered with the beam 104, the sensing package 106 (shown in FIGS. 2 and 3) within the cavity 116 is also not vertically centered relative to the beam 104.

The neck 204 extends a height 610 from the plate 202 to the cover 210. In the illustrated embodiment, the height 610 of the neck 204 is at least 20% of the height 602 of the beam 104, and optionally may be at least 20% of the height 602. For example, if the beam 104 is 10 cm tall, then the neck 204 may be at least 2 cm tall, and optionally at least 2.5 cm tall. The neck 204 combined with the plate 202 have a combined height 612 from the load-bearing surface 110 to the cover 210. In the illustrated embodiment, the combined height 612 may be at least 33% of the height 602 of the beam 104.

The plate 202 extends a lateral width 614 from a first edge 616 to an opposite, second edge 618 thereof. In an embodiment, the wide end 216 of the neck 204 that is joined to the plate 202 has a width 316 that is at least half (e.g., 50%) of the width 614 of the plate 202. Thus, the neck 204 has a relatively thick width at the wide end 216 and gradually tapers to the narrow end 218. The thick, tapered neck 204 may be able to dissipate stress over a larger area than the transition or neck regions of known sensor assemblies, resulting in a reduced peak stress within the neck 204.

The base wall 208 has a vertical thickness 622 from the mounting surface 112 to the interior surface 222 of the base wall 208. The cover 210 has a thickness 624 from the interior surface 220 to an exterior surface 326 of the cover 210. The exterior surface 326 is joined to the neck 204. In the illustrated embodiment, the thickness 622 of the base wall 208 is greater than the thickness 624 of the cover 210. For example, the thick base wall 208 provides a support base for the beam 104. The cover 210 may be relatively thin to provide structural support while allowing load transfer from the neck 204 to the sensing package 106 (FIGS. 2 and 3) within the cavity 116.

In the illustrated embodiment, the cover 210 of the beam 104 includes two upright members 630 and a ceiling member 332 extending between and connecting the two upright members 630. The upright members 630 are joined to the base wall 208 at, or proximate to, the first and second edges 212, 214 thereof. For example, the upright members 630 include a first upright member 630a joined to the base wall 208 at the first edge 212 and a second upright member 630b joined to the base wall 208 at the second edge 214. The upright members 630 extend generally vertical, parallel to the vertical axis 192. For example, axes or planes of the upright members 630 may be within 5 degrees, 10 degrees, or 15 degrees of the vertical axis 192. The ceiling member 332 is connected (e.g., joined) to respective upper ends 334 of the upright members 630, spaced apart from the base wall 208. As used herein, relative or spatial terms such as "upper," "lower," "top," "bottom," "front," and "rear" are only used to distinguish the referenced elements and do not necessarily require particular positions or orientations relative to gravity and/or the surrounding environment of the beam 104 or load transfer mechanism (FIGS. 2 and 3).

The ceiling member 332 laterally extends between the two upright members 630. The ceiling member 332 may be arched or curved in an upward direction away from the base wall 208. The ceiling member 332 defines the exterior surface 326 of the cover 210 that is joined to the neck 204. The neck 204 may be joined to the exterior surface 326 at a lateral center of the ceiling member 332, which is a midpoint between the two upright members 630. The ceiling member 332 defines the interior surface 220 that engages the sensing package 106. The cavity 116 is defined laterally between the two upright members 630 and vertically between the interior surface 222 of the base wall 208 and the interior surface 220 of the ceiling 332. In the illustrated embodiment, the cavity 116 has an oblong cross-sectional shape such that a width 636 of the cavity 116 is greater than the height 604 of the cavity 116. Thus, the cavity 116 does not have a circular cross-sectional shape in the illustrated embodiment.

The beam 104 as described is asymmetrical along the height 602 of the beam 104, such that a top half of the beam 104 (e.g., including the plate 202) does not mirror a lower half of the beam 104 (e.g., including the base wall 208). The designed shape of the beam 104 may lower the neutral axis of the beam 104 below the geometric midpoint 606 of the beam 104. The neutral axis represents the axis through the beam 104 where the stress is zero, without compression or tension. The neutral axis may align with the cavity 116, such that the sensing package 106 is located at or proximate to the neutral axis. Locating the sensing package 106 at the neutral axis may eliminate (or at least reduce) shear stress influence on the sensing package 106 (relative to spacing the sensing package 106 apart from the neutral axis).

The neck 204 of the beam 104 may have a longer vertical height 610 relative to the height 602 of the beam 104 than known sensor assemblies, which may provide the benefit of a longer determinate (e.g., single) load path transition from the top, load-bearing surface 110 to the sensing package 106. The neck 204 also may taper gradually from a wide end 216 at the plate 202 to a narrow end 218 at the cover 210. The longer determinate load path and thick, tapered neck 204 may allow for increased load transfer with reduced stress in the beam 104 relative to known sensor assemblies that have short and/or narrow necks between top plates and tube regions that hold the sensing elements.

A feature of weigh-in-motion sensors having pre-load configurations as disclosed herein is the ability to provide a sensor having an improved resistance to maximum stress while providing a relatively high degree of sensor measurement sensitivity, thereby enabling using such sensors in end-use applications not before possible without risking damage, thereby extending effective service life, and doing so while retaining a desired degree of sensor measurement sensitivity. An additional feature is one of assembly flexibility as provided by the ability to install the piezoelectric element into the cavity through the fastener aperture, which may be simpler and more easily realized then installing the piezoelectric element into the cavity from one end of the beam.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A weigh-in-motion sensor construction comprising:
   a beam elongated along a depth axis of the sensor construction, the beam comprising:
      a plate with a load-bearing surface;
      a tube portion including a base wall and a cover and a cavity between the base wall and the cover; and
   a sensing package disposed within the cavity of the beam and under pre-load in engagement with the cover and the base wall, wherein the sensing package comprises a piezoelectric element and a guide plate, wherein the guide plate comprises a first planar section having an opening therethrough and accommodating placement of the piezoelectric element therein, the first planer section extending radially to a guide plate second section that extends axially away from the first section;
   wherein the base wall includes an aperture extending therethrough from a mounting surface to the cavity, the aperture configured to receive a fastener therethrough to secure the sensing package within the cavity, and wherein the fastener is sized having a cross-section dimension taken through a center axis of the fastener that is greater than that of a cross-section dimension of the piezoelectric element taken along the fastener center axis.

2. The weigh-in-motion sensor construction as recited in claim 1, wherein the fastener has a cross-sectional dimension sized about 10 percent or greater in dimension than that of the respective cross-section dimension of the piezoelectric element.

3. The weigh-in-motion sensor construction as recited in claim 1, wherein the base wall laterally extends from a first edge to a second edge that is opposite the first edge, and wherein the cover is joined to the base wall at or proximate to the first and second edges.

4. The weigh-in-motion sensor construction as recited in claim 1, wherein the beam further comprises a neck extending between and joining the plate to the cover of the tube portion.

5. The weigh-in-motion sensor construction as recited in claim 1, wherein the sensing package further comprises:
   an upper electrode disposed on an upper surface of the piezoelectric element; and
   a lower electrode disposed on a lower surface of the piezoelectric element;
   wherein the guide plate is interposed between the upper and lower electrodes.

6. The weigh-in-motion sensor construction as recited in claim 5, wherein the sensing package further comprises an upper dielectric layer interposed between the first electrode and the cavity, and a lower dielectric layer interposed between the second electrode and a substrate, wherein the substrate is interposed between the lower dielectric layer and the fastener.

7. The weigh-in-motion sensor construction as recited in claim 6, wherein the guide plate second section extends axially a distance along a portion of a sidewall surface of the substrate towards the fastener.

8. The weigh-in-motion sensor construction as recited in claim 6, wherein the substrate is formed from a metallic material and has a cross-section dimension that is greater than the piezoelectric element, and that is greater than the cross-section dimension of the fastener.

9. A load transfer mechanism and sensor construction comprising:
   a beam comprising:
      a plate with a load-bearing surface;
      a tube portion including a base wall and a cover, the base wall and the cover including respective interior surfaces that define a cavity therebetween, the base wall comprising an aperture extending therethrough from a mounting surface of the beam to the cavity, and a fastener disposed in the aperture;
      a neck extending between and joining the plate to the cover, the neck tapering from a wide end at the plate to a narrow end at the cover;
   a sensing package disposed within the cavity and comprising:
      a piezoelectric element;

first and second electrodes disposed along opposed respective surfaces of the piezoelectric element;

first and second insulating layers disposed over respective surfaces of the first and second electrodes opposite respective surfaces of the piezoelectric element;

a substrate interposed between the piezoelectric element and the fastener; and a guide plate interposed between the upper and lower electrodes, the guide plate comprising a first planar section extending radially outwardly from the piezoelectric element to a second section that extends axially away from the first section and that extends a distance along a wall surface of the substrate;

wherein the sensing package engages the respective interior surfaces of the cover and the substrate for measuring forces exerted on the load-bearing surface of the plate; and wherein the fastener is sized having a cross-section dimension taken through a center axis of the fastener that is greater than a cross-section dimension of the piezoelectric element as measured along the fastener center axis.

10. The load transfer mechanism and sensor construction as recited in claim 9, wherein the beam extends a height from the load-bearing surface of the plate to a mounting surface of the base wall, wherein a midpoint of the height of the beam is vertically spaced apart from a midpoint of a height of the cavity between the respective interior surfaces of the cover and the base wall.

11. The load transfer mechanism and sensor construction as recited in claim 9, wherein the fastener is a threaded screw configured to engage the sensing package, wherein a depth that the threaded screw extends into the cavity is adjustable via a torque application on the threaded screw to modify a force of pre-load exerted on the sensing package.

12. The load transfer mechanism and sensor construction as recited in claim 9, wherein the fastener is in the form of a pin, and wherein a retaining element is used to provide an axial position of the fastener within the cavity to impose a force of pre-load exerted on the sensing package.

13. The load transfer mechanism and sensor construction as recited in claim 9, wherein the fastener is sized 10 percent or more in dimension than that of the respective dimension of the piezoelectric element.

14. The load transfer mechanism and sensor construction as recited in claim 9, wherein the fastener is sized from about 10 to 100 percent greater in dimension than that of the respective dimension of the piezoelectric element.

15. The load transfer mechanism and sensor construction as recited in claim 9, wherein the beam has a unitary, monolithic structure such that the neck is integrally connected to the plate and the tube portion.

16. A load transfer mechanism and sensor construction comprising:

a beam elongated along a depth axis of the load transfer mechanism, the beam comprising:
a plate with a load-bearing surface;
a tube portion including a base wall, two upright members, a ceiling member, and a cavity formed therein; and
a neck extending between and joining the plate to the ceiling member;

a sensing package disposed in the cavity and configured to engage an interior surface of the ceiling member for measuring forces exerted on the load-bearing surface of the plate, wherein the sensing package comprises:
a piezoelectric element;
electrodes disposed on opposed surfaces of the piezoelectric element;
a substrate connected with electrodes and the piezoelectric element; and
a guide plate comprising a first planar section having an opening therethrough and accommodating placement of the piezoelectric element therein, the first planer section extending radially to a second section that extends axially away from the first section and that extends a distance along a wall surface of the substrate;

wherein the base wall includes an aperture extending therethrough from a mounting surface to the cavity, and wherein a fastener is disposed within the aperture and in contact with the sensing package, and wherein the fastener is sized having a cross-section dimension taken through a center axis of the fastener that is greater than that of a cross-section dimension of the piezoelectric element taken along the fastener center axis.

17. The load transfer mechanism and sensor construction as recited in claim 16, wherein the fastener is in contact with the substrate and imposes a force of pre-load exerted on the sensing package.

18. The load transfer mechanism and sensor construction as recited in claim 16, wherein the substrate is formed from a metallic material and wherein the sensing package further comprises insulating layers interposed between one of the electrodes and the substrate and the other of the electrodes and the interior surface of the cavity.

* * * * *